(No Model.)
C. G. DERBY.
TRELLIS.
No. 485,912. Patented Nov. 8, 1892.
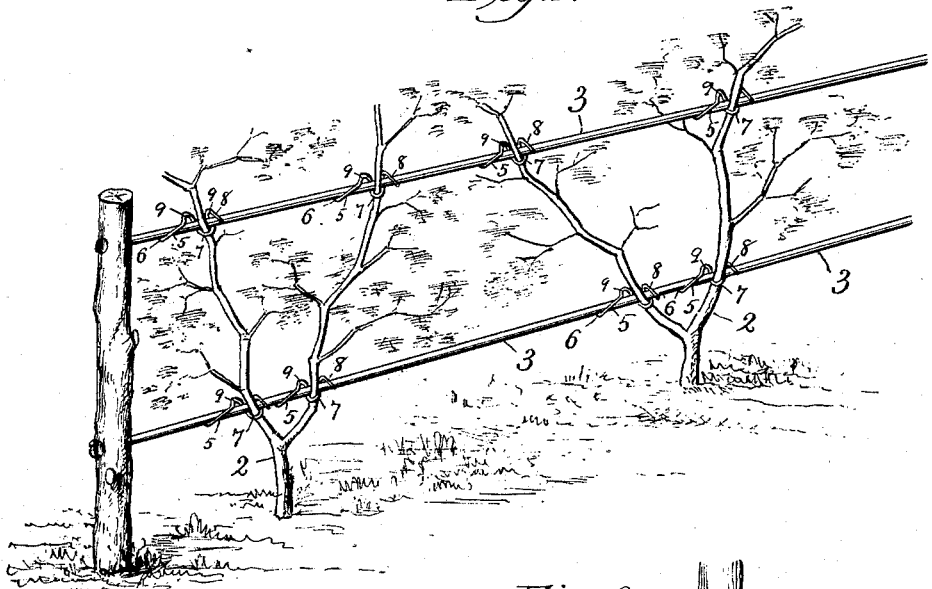
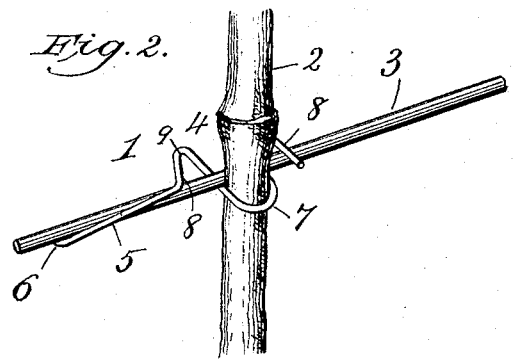
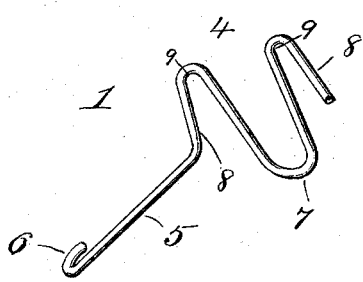
Witnesses
Wm. A. Schoenborn
H. J. Riley
Inventor
Charles G. Derby.
By his Attorneys,
C. A. Snow & Co.
THE NORRIS PETERS CO., PHOTO-LITHO., WASHINGTON, D. C.

UNITED STATES PATENT OFFICE.

CHARLES G. DERBY, OF LAONA, NEW YORK.

TRELLIS.

SPECIFICATION forming part of Letters Patent No. 485,912, dated November 8, 1892.

Application filed September 8, 1891. Serial No. 405,077. (No model.)

*To all whom it may concern:*

Be it known that I, CHARLES G. DERBY, a citizen of the United States, residing at Laona, in the county of Chautauqua and State of New York, have invented a new and useful Trellis, of which the following is a specification.

The invention relates to improvements in trellises.

The object of the present invention is to provide a simple and inexpensive fastener for securing vines to the horizontal wires of trellises to prevent the vines sagging and dropping under the weight of their fruit and to avoid injuring the latter.

A further object of the invention is to provide a fastener which may be used for a number of seasons and which may be readily secured to a horizontal trellis-wire to attach a vine thereto and to be quickly removed therefrom when desired.

The invention consists in the construction and novel combination and arrangement of parts hereinafter fully described, illustrated in the accompanying drawings, and pointed out in the claims hereto appended.

In the drawings, Figure 1 is a perspective view of a portion of a trellis provided with fasteners constructed in accordance with this invention. Fig. 2 is a detail perspective view illustrating the manner of securing a vine to a horizontal wire. Fig. 3 is a detail view of one of the fasteners.

Like numerals of reference designate corresponding parts in all the figures of the drawings.

1 designates a fastener constructed of a single piece of spring-wire or other suitable material and adapted to fasten a vine 2 to a horizontal wire 3 of a trellis and capable of being quickly secured in position and of being readily removed therefrom, so that it may be used from season to season and does not form a permanent portion of the wire 3 after being once secured thereto.

The fastener consists of a clip 4, which is approximately the shape of the letter W, and a stem 5, which forms a continuation of the clip and is provided at its other end with a hook 6. The clip has a central approximately- U-shaped loop portion 7 and side arms 8, and a horizontal wire passes between the central loop portion 7 and the arms 8, thereby confining the vine in the loop portion 7 at the inner end thereof, as clearly shown in the drawings. The arms 8 and the sides of the loop portion form the wire-receiving crotches 9, arranged at opposite sides of the loop, and are adapted to give to allow a plant to expand by growth without being injured by the clip. The stem 5 extends along the horizontal wire 3, and the hook engages the face of the wire opposite the face which the inner arm of the clip engages—that is to say, if the arms be arranged on the upper face of the wire 3 the hook will engage the lower face thereof, and vice versa.

The fasteners are simple and inexpensive in construction and may be readily attached to a horizontal wire and are capable of securely holding a vine and of preventing the same sagging and dropping under the weight of its fruit.

The fasteners do not cut or in any wise injure the vine, which is a great advantage.

What I claim is—

The combination, with a horizontal trellis-wire and a plant, of a fastener constructed of a single piece of wire and consisting of a yielding resilient U-shaped loop receiving the plant and arranged beneath the wire and having its terminals bent at an angle and arranged above the trellis-wire, one of the terminals being extended longitudinally of the trellis-wire and forming a stem provided at its outer end with a hook engaging the trellis-wire, substantially as described.

In testimony that I claim the foregoing as my own I have hereto affixed my signature in the presence of two witnesses.

CHARLES G. DERBY.

Witnesses:
L. L. CROCKER,
K. W. FORBES.